United States Patent
Erharter et al.

(10) Patent No.: US 11,492,021 B2
(45) Date of Patent: Nov. 8, 2022

(54) HYBRID CABLE/RAIL TRANSPORTATION SYSTEM

(71) Applicant: LEITNER S.P.A., Vipiteno (IT)

(72) Inventors: Nikolaus Erharter, San Candido (IT); Hartmut Wieser, Racines (IT)

(73) Assignee: LEITNER S.P.A., Vipiteno (IT)

(*) Notice: Subject to any disclaimer, the term of this patent is extended or adjusted under 35 U.S.C. 154(b) by 359 days.

(21) Appl. No.: 16/891,948

(22) Filed: Jun. 3, 2020

(65) Prior Publication Data
US 2020/0385029 A1    Dec. 10, 2020

(30) Foreign Application Priority Data
Jun. 5, 2019    (IT) .................. 102019000008160

(51) Int. Cl.
*B61B 15/00* (2006.01)
*B61B 1/00* (2006.01)
(Continued)

(52) U.S. Cl.
CPC ............ *B61B 15/00* (2013.01); *B61B 1/00* (2013.01); *B61B 7/04* (2013.01); *B61B 12/022* (2013.01); *B61B 12/028* (2013.01); *B61D 15/00* (2013.01)

(58) Field of Classification Search
CPC .... B61B 1/00; B61B 1/02; B61B 3/00; B61B 7/00; B61B 7/04; B61B 12/002;
(Continued)

(56) References Cited

U.S. PATENT DOCUMENTS

| | | | |
|---|---|---|---|
| 6,321,658 B1* | 11/2001 | Pabst | B61B 12/125 104/216 |
| 2021/0031811 A1* | 2/2021 | Erharter | B61F 5/50 |
| 2022/0227401 A1* | 7/2022 | Erharter | B61B 15/00 |

FOREIGN PATENT DOCUMENTS

| | | | |
|---|---|---|---|
| DE | 378 915 C | 8/1923 | |
| DE | 518644 C | * 12/1928 | B61B 15/00 |

(Continued)

OTHER PUBLICATIONS

Italian Search Report for Italian Application No. IT 2019000008160 dated Feb. 10, 2020.

*Primary Examiner* — Zachary L Kuhfuss
*Assistant Examiner* — Cheng Lin
(74) *Attorney, Agent, or Firm* — Neal, Gerber & Eisenberg LLP (57) ABSTRACT

A hybrid cable/rail transportation system comprising: at least one portion of the system configured as a cable transportation system; at least one portion of the system configured as a rail transportation system, a first trolley coupled to the supporting cable and comprising a first coupling device for coupling to the cabin; a second trolley coupled to the rail and comprising a second coupling device for coupling to the cabin; a plurality of transportation units wherein each transportation unit comprises a cabin, each cabin comprising a roof provided with a coupling system configured for coupling the cabin to the first trolley along the system portion configured as a cable transportation system and to the second trolley along the system portion configured as a rail transportation system; wherein the coupling system arranged on the roof of the cabin, the first coupling device of the first trolley and the second coupling device of the second trolley are configured for allowing a progressive passage of the cabin from the first to the second trolley, or vice-versa, without stopping the support.

20 Claims, 7 Drawing Sheets

(51) Int. Cl.
 B61B 7/04 (2006.01)
 B61B 12/02 (2006.01)
 B61D 15/00 (2006.01)

(58) Field of Classification Search
 CPC ..... B61B 12/02; B61B 12/022; B61B 12/024;
  B61B 12/028; B61B 15/00; B61D 15/00;
  B61D 15/125
 See application file for complete search history.

(56) References Cited

FOREIGN PATENT DOCUMENTS

| DE | 518 644 C | 2/1931 | |
|---|---|---|---|
| FR | 3 001 432 A1 | 8/2014 | |
| FR | 3001432 A1 * | 8/2014 | ............. B61B 15/00 |
| WO | WO 2015/077806 A1 | 6/2015 | |

* cited by examiner

HYBRID CABLE/RAIL TRANSPORTATION SYSTEM

PRIORITY CLAIM

This application claims the benefit of and priority to Italian Patent Application No. 102019000008160, filed on Jun. 5, 2019, the entire contents of which is incorporated by reference herein.

TECHNICAL FIELD

The present disclosure relates to a transportation system. In particular, the present disclosure relates to a hybrid cable/rail transportation system wherein the transportation units travel along the route where a cable transportation portion and a rail transportation portion follow one another without transportation interruption. The expression "without transportation interruption" means that passengers do not have to get off the transportation unit at the end of the cable transportation section and enter another transportation unit in order to travel along the rail transportation section. However, "without transportation interruption" does not mean that the transportation units may not be stopped at stations located along the route.

BACKGROUND

Transportation systems in which people or things are transported along a route inside transportation units moved one after the other can be divided into two different types which are alternately used according to some boundary conditions. A first type of system corresponds to cable transportation systems in which the transportation units are supported suspended from the ground by at least one supporting cable. In this type of cable system, the transportation units hang from the supporting cable by a trolley and, inferiorly, do not rest on any support structure. The second type of system corresponds to rail transportation systems in which the transportation units are supported directly by rails or by a trolley supported, in turn, by rails. This last type of rail system can be further divided into two subgroups depending on whether the rails are in a raised position from the ground or at ground level. In both cases (according to the prior art) the transportation units rest inferiorly on a special trolley which in turn rests on the rails. For the purposes of the present disclosure, "rail transportation system" refers to both these two categories in which the rails can either be in a raised position or at ground level.

Selecting one type of system rather than the other (cable or rail) mainly depends on the morphology of the route to be travelled, which can have a planimetric or an altimetric layout, or a combination thereof with rectilinear sections but considerable slopes, or curvilinear but substantially flat sections.

The functional choice of using a cable system or a rail system can be summarized as follows:
- if the planimetric layout includes curvilinear and rectilinear sections but no significant slopes (typical urban environment), it is preferable to use a rail transportation system;
- if the planimetric layout includes steep slopes and significant altitude differences (however mainly on rectilinear sections), it is preferable to use a cable transportation system.

Currently, in the case of certain hybrid routes (i.e., with sections that would be suitable for cable transportation followed by sections suitable, instead, for rail transportation), it is known to provide two different systems one after the other in which, even in the presence of a shared intermediate interchange station, users are required to change transportation units to pass from one system to the other. Even if the systems are adjacent, there is still an inconvenience for passengers due to the transfer from one system to the other.

PCT Patent Application No. WO2015/077806 describes a transportation system wherein the transportation units travel without transportation interruption along the route where cable transportation portions and rail transportation portions, particularly with the rail raised from the ground, follow one another. According to PCT Patent Application No. WO2015/077806, the cabin-type transportation units include a roof to which a first trolley is externally constrained, the latter being configured to be supported by the supporting cables and to allow the transportation units to move forward in the portion of the system configured as a cable system. The exchange from a cable route portion to a rail route portion takes place in the station where the transportation units are already usually released from the cables and move forward supported and suspended from special upper rails. Before leaving the station, the first trolley, constrained to the roof of the cabins, couples to a second motor or motorized trolley resting on these upper rails. Outside the station, the rails of the section of the rail system are nothing more than the continuation of the upper rails of the exchange station. Therefore, in this configuration, the transportation units are supported, hanging from the rail, by the second trolley and inferiorly hang in mid-air, with their first trolley coupled to the second motorized trolley. As a result of the motorization of the second motor trolley, the transportation units move along the rails and travel (always uplifted) along the rail route section. Therefore, according to PCT Patent Application No. WO2015/077806, the transportation units used along the section of the cable system are transported integrally (hence with the respective first trolley) by the second trolley along the section of the rail system.

This solution, while eliminating the transfer of passengers between the different systems, has some drawbacks, in particular with reference to the rail portion of the transportation route. First of all, this solution does not provide the rail system section with the possibility of being at ground level. Furthermore, the solution described in PCT Patent Application No. WO2015/077806 expressly provides that the first trolley (the one operating along the cable section) is also transported along the rail section. This moving mass, which is unnecessary, limits the dynamics of the system and involves much larger dimensions than required in a classic rail transportation system where the rail rests on the ground.

SUMMARY

It is an object of the present disclosure to provide a hybrid cable/rail transportation system which can overcome certain of the drawbacks of certain of the prior art.

In accordance with this object, the present disclosure relates to a hybrid cable/rail transportation system comprising a plurality of transportation units; wherein each transportation unit comprises a cabin which is provided with at least a roof and a floor. The system of the present disclosure is defined as "hybrid" because it comprises at least one portion of the system configured as a cable transportation system, with at least one supporting cable, and at least one portion of the system configured as a rail transportation system, with at least one rail. The transition from one portion of the system to the other takes place at an intermediate station where the supporting cable ends and the track starts. Of course, the present disclosure also provides the reverse possibility, in which the rail system portion is upstream of the intermediate station and the cable system portion is downstream of the intermediate station. In certain embodiments, inside the station the supporting cable is replaced by an upper track which has the function of supporting the cabin in a suspended configuration for at least one section of the station.

The forward movement of the cabins along the cable or rail system sections can be controlled in various ways, for example, it is possible to provide the presence of a hauling cable or specific motors integrated directly into the transportation units (for example by providing motorized trolleys) or through linear actuators.

Each cabin is configured to be moved along the entire system and passengers are not required to exchange cabin when passing from one portion of the system to the other. That is, each cabin is configured to be selectively supported by a first trolley along the portion of the system configured as a cable transportation system, and by a second trolley along the portion of the system configured as a rail transportation system, wherein the first and the second trolley are respectively equipped with a first and a second device for coupling to the cabin, in particular to a coupling system externally constrained by the cabin. In the portion of the system configured as a rail transportation system, the latter can be above or at ground level.

According to certain aspects of the present disclosure, the cabin coupling system configured to be coupled to the trolley coupling devices is arranged on the outside of the roof of the cabin. In this way, the coupling system arranged on the roof of the cabin, the first coupling device of the first trolley and the second coupling device of the second trolley are configured for allowing a progressive passage of the cabin from the first to the second trolley, or vice-versa, without stopping the support. Once the exchange has taken place, the trolley no longer constrained to the cabin can follow a different path from that followed by the cabin, for example it can be directed to the exit of the station where it will be coupled to another cabin again. Advantageously, in this way, the first trolley is not also moved along the rail system section, and therefore, the moving mass is less, the dynamics of the system is improved in terms of dynamic performance and less loads are weighing on the structures. In addition, the overall dimensions of the entire vehicle are reduced as they only involve the second trolley with the cabin, without the bulk of the first trolley located above.

With the rails placed above or at ground level, in certain embodiments, the second trolley comprises a first portion of the frame coupled to the rail, and a second portion of the frame which extends vertically from the first portion of the frame to a position where it can be coupled to the coupling system provided outside the cabin roof. In this configuration, the cabin is constrained to the second trolley only on the upper part, whereas the floor does not rest on any structure but is separated therefrom and faces the first portion of the frame of the second trolley resting on the rails.

The coupling system may comprise separate coupling devices (i.e., a first coupling device configured to be selectively coupled to the coupling device of the first trolley, and a separate second coupling device configured to be selectively coupled to the second coupling device of the second trolley). Alternatively, the coupling system may comprise a single coupling frame body having a first coupling portion configured to be coupled to the first coupling device of the first trolley, and a second coupling portion configured to be coupled to the second coupling device of the second trolley.

In the description of the figures, an embodiment of the coupling system will be described, wherein two frames or coupling structures constrained to the opposite edges of the roof are provided, wherein the first coupling portions face each other whereas the second coupling portions face the outside of the cabin. In the embodiment shown in the figures, the coupling devices or portions comprise U-shaped seats facing the roof of the cabin, with the coupling devices of both trolleys comprising suspending rolls whose axis is parallel to the forward movement direction of the cabin. In this example, the cabin is supported by the trolleys by the aforementioned rolls which ensure that the cabin is raised by acting from below in the respective U-shaped seats. It should be appreciated that in this embodiment, the transfer of support from one trolley to another takes place by moving the cabin forward to the exchange area where an upward- or downward-sloping ramp is provided for the second trolley. In the passage from the first to the second trolley, the cabin enters the station with the U-shaped seats of the first coupling portion occupied by the suspending rolls of the first trolley. At the beginning of the exchange area, the suspending rolls of the second trolley face the respective seats but are at a lower level. At this point, the first and the second trolley are moved forward at the same speed, but the first trolley is moved forward at a constant height whereas the second trolley is driven up a ramp. At the end of the upward-sloping ramp, the suspending rolls of the second trolley are in the respective U-shaped seats to support the cabin, whereas the rolls of the first trolley are at a lower height and disengaged from the seats. In this condition, the first trolley is released from the cabin and can follow a different path. The exchange from the second to the first trolley occurs in the reverse order. In this exchange, the second trolley is driven down a ramp until the U-shaped seats of the first coupling portion intercept the rolls of the first trolley. From this moment on, in the further downhill section, the second trolley is released from the cabin which is already supported by the first trolley.

The inclinations of the upward- and downward-sloping ramps are such that people inside the cabin do not even perceive the passage from one section of the system to another and the cabin is not subjected to jumps or jolts.

To make the landing of passengers from the cabin comfortable, when the latter is supported by hanging from the second trolley, and reduce the oscillations during the exchange, in certain embodiments, the second coupling devices (the suspending rolls in the example shown) are supported by a dampened rocker arm configured to allow dampened longitudinal oscillations of the cabin.

To increase safety it is possible to provide a special security device (for example a pin operated by cam levers) configured to constrain the cabin to the trolleys even in the event of accidental failure of the main coupling.

Additional features are described in, and will be apparent from the following Detailed Description and the figures.

BRIEF DESCRIPTION OF THE DRAWINGS

Further features and advantages of the present disclosure will be apparent from the following description of a non-limiting embodiment thereof, with reference to the figures of the accompanying drawings, wherein.

DETAILED DESCRIPTION

Figure 1:
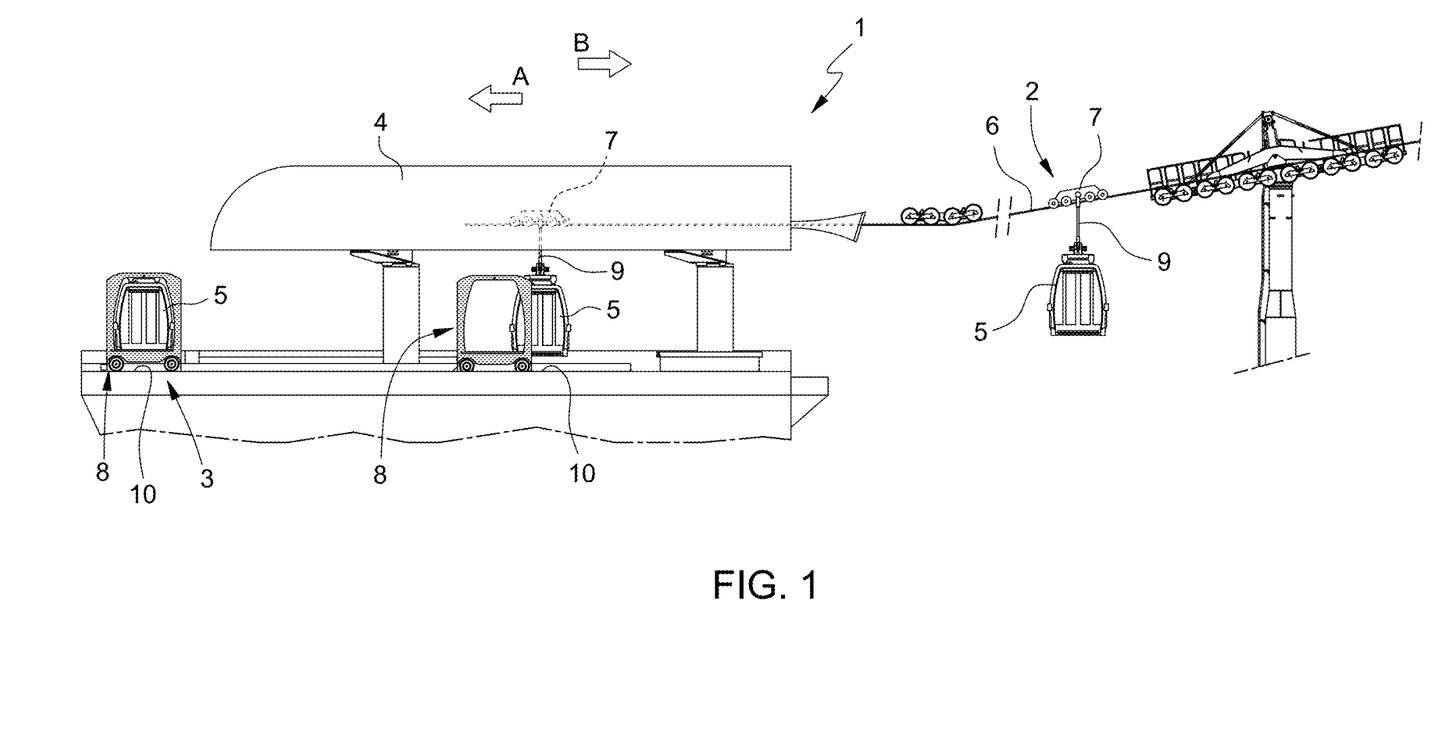
FIG. 1 is a schematic view of a portion of a hybrid cable/rail transportation system according to the present disclosure.

The present disclosure relates to a hybrid cable/rail transportation system. In particular, FIG. 1 shows a schematic view of a portion of a hybrid cable/rail transportation system (schematized by the reference numeral 1) according to the present disclosure. This figure shows a portion of the system configured as a cable transportation system, generally designated by the reference numeral 2, and a portion of the system configured as a rail system, generally designated by the reference numeral 3. These two different configurations of the system are connected to each other at an intermediate station 4 in which a cabin 5 enters supported in one way and from which it comes out supported in another way. The arrows A and B indicate that, according to the present disclosure, the direction of travel of the system can be oriented in either direction to switch from the cable support to the rail support, or vice versa. In different embodiments, the system can be of the "back-and-forth" type with a single up and down branch, or it can have parallel up and down branches. For the purposes of the present disclosure, the actuation of motion both along the cable section and along the rail section can be of any type (i.e., it is possible to provide for the presence of a hauling cable or suitable motors integrated into the trolleys present along the sections of the system). As schematized in FIG. 1, the portion of the system configured as a cable system 2 includes a supporting cable 6 which also acts as a hauling cable in this portion of the system. Along the cable system portion, the cabin 5 is supported in a configuration hanging in mid-air (not resting on any structure inferiorly) by a first trolley 7 coupled to the supporting rope 6 and equipped with a support arm connected to the roof of the cabin 5. According to the present disclosure, alternative cable systems can be provided with several supporting cables and, optionally, a hauling cable. Although the term "trolley" may, in certain instances be, more suitable for systems with two supporting cables, according to the present disclosure the term "first trolley" also refers to the clamping device alone provided for single-rope systems. In the portion of the system configured as a rail system 3, the cabin 5 is supported by a second trolley 8, which, in turn, is supported by resting on a rail 10. As will be apparent in the description of the following figures, the cabin 5 of the rail section 3 is exactly a cabin 5 which was previously moved along the cable section of the system and has been released from the respective first trolley 7 and coupled to the second trolley 8.

Figure 2:
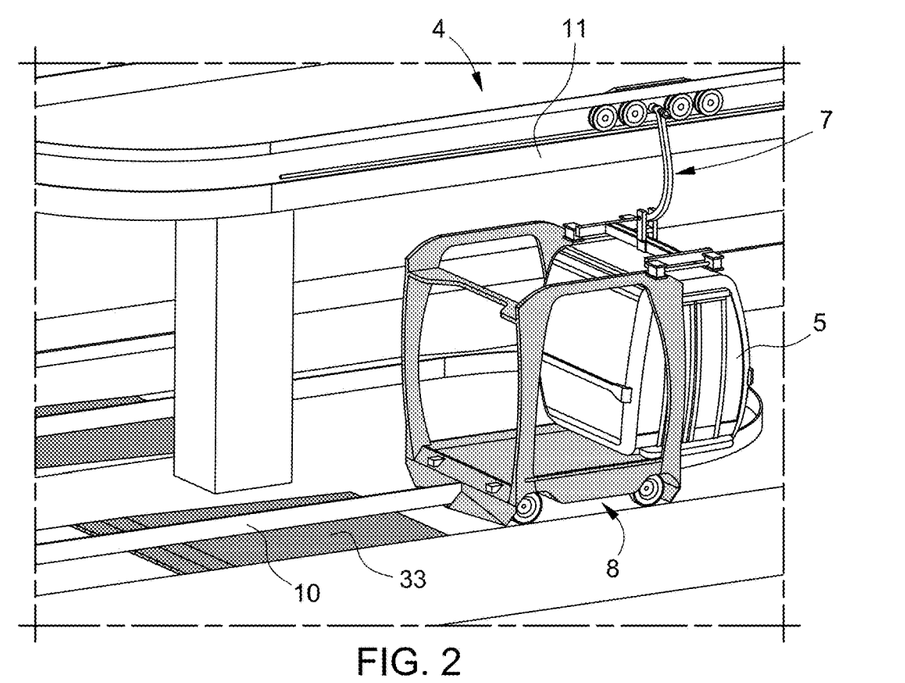
FIGS. 2 to 4 are schematic views of successive operating phases of the system in FIG. 1.
Figure 3:
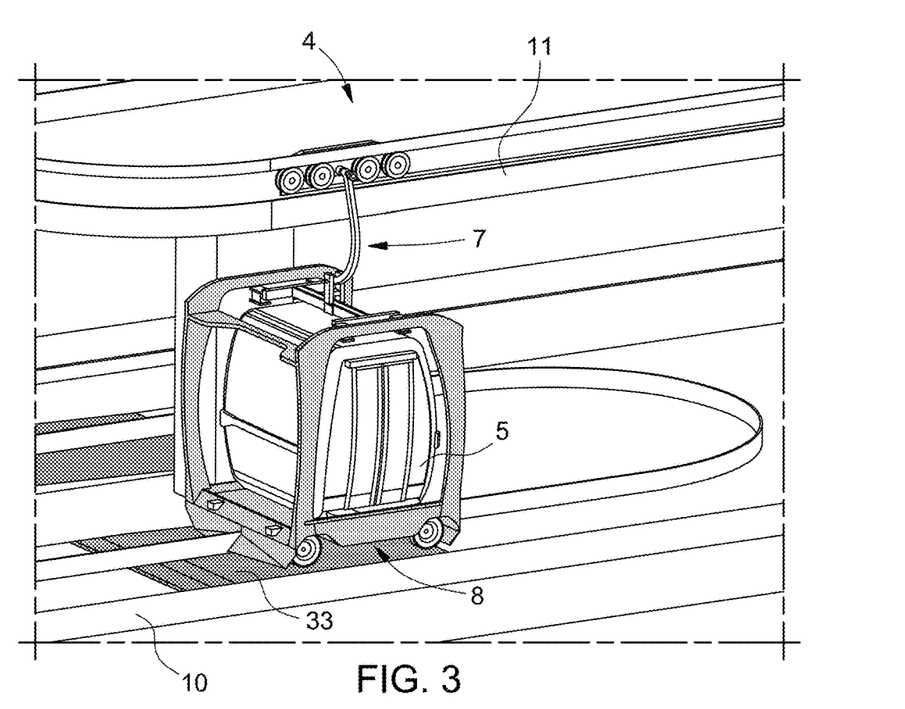
Figure 4:
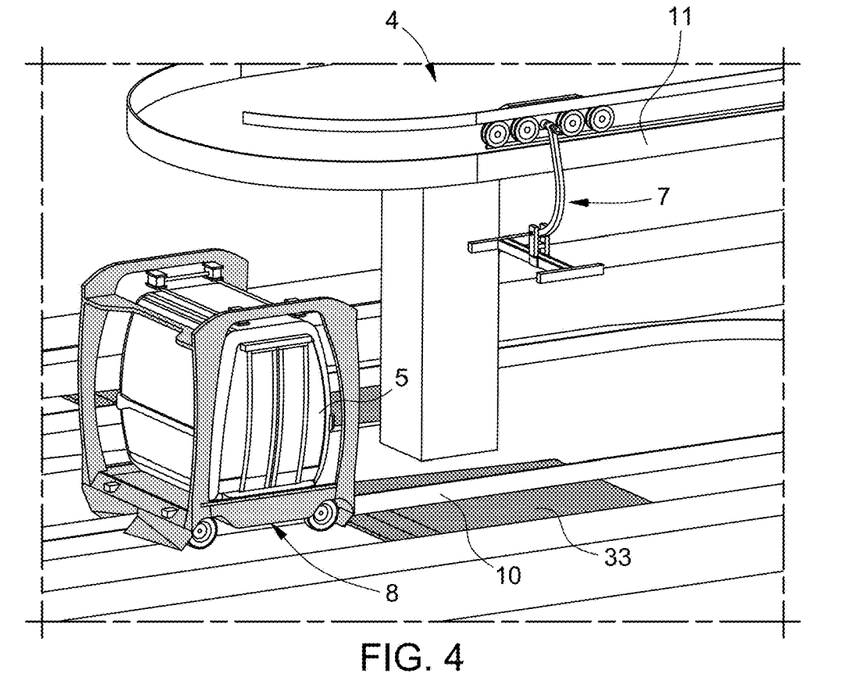

FIGS. 2 to 4 are precisely schematic views of successive operating phases of the system in FIG. 1, in particular they show the operation of the system inside the station 4 where the cabin 5 is released from the respective first trolley 7 and coupled to the second trolley 8. FIG. 2 shows a cabin 5 entering the station 4 after travelling along a cable portion of the system 2. As is known, inside the station, the function of supporting the cabin in the suspended configuration is ideally transferred from the supporting cable 3 to an upper track 11 supporting the first trolley 7. When the cabin enters the station 4 it is thus moved supported by hanging from the upper track 11 along a path where the first section of the rail 10 (which can be a single rail or a pair of tracks, or the like) is located under the floor of the cabin 5, which rail will then continue outside the station 4 along the rail portion of the system 3. As can be seen, in the station there is a second trolley 8 supported by resting on the rail 10 and ready to receive the cabin 5. FIG. 3 shows a subsequent phase in which the cabin 5 still constrained to the first trolley is moved forward until it reaches the second trolley 8. FIG. 3 shows a phase in which the coupling to the second trolley starts on one side and the phases of release from the first trolley 7 start on another side. In this phase, the two trolleys can move forward with the cabin with synchronous motion, or the exchange can take place while the cabin is stationary. In this example, the cabin 5, before being completely released from the first trolley 7, is coupled to the second trolley 8 and then continues for a relatively short stretch, which is, in certain embodiments, straight, with a double support. Once the coupling to the second trolley 8 is ensured, the cabin 5 is released from the first trolley 7 which proceeds in plan along a different path from that of the cabin 5 supported by the second trolley 8. FIG. 4 schematically shows the configuration in which the cabin 5 is no longer supported by the first trolley 7 and proceeds supported by the second trolley 8. In certain embodiments, the first trolley 7 is sent back to the station 4, and before leaving this station is coupled to another cabin which travels along the system in the opposite direction and has just travelled along a previous rail portion of the system 3.

Figure 5:
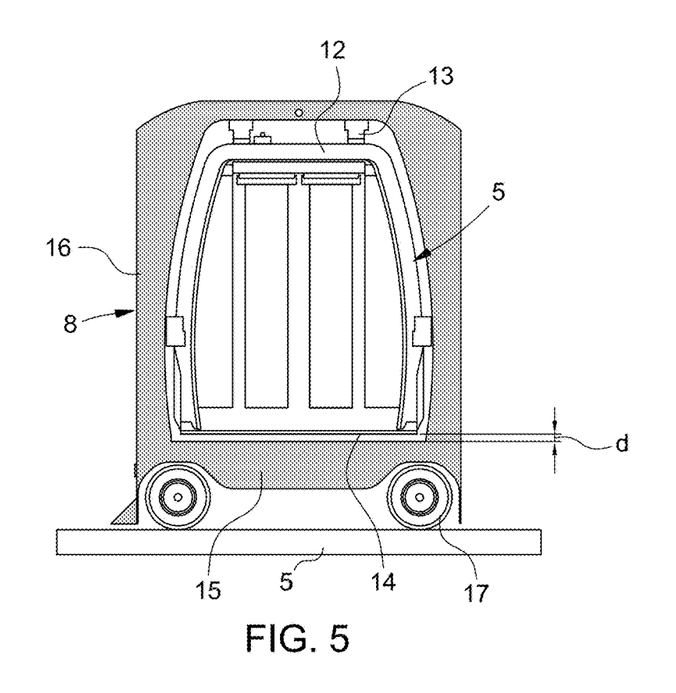
FIG. 5 is an enlarged schematic view of the cabin in the configuration of FIG. 4.

FIG. 5 shows an enlarged schematic view of the cabin in the configuration of FIG. 3 in which it is coupled to the second trolley 8. It should be appreciated that how this second trolley 8 is configured to support the cabin 5 along the rail section 3 is one of the inventive cores of the present disclosure. As can be seen in FIG. 5, the second trolley 8 is configured to support the cabin 5 in a configuration hanging in mid-air (i.e., with the floor 14 not resting on any support inferiorly). That is, as shown, the second trolley 8 is configured to be coupled to respective coupling devices provided on the roof 12 of the cabin 5. To this end, the second trolley 8 comprises a first portion of the frame 15 coupled to the rail 5 and a second portion of the frame 16 which extends from the first portion 15 to the roof 12 of the cabin 5. In this example, the first portion of the frame 15 comprises a platform provided with wheels 17 in which, during use, a distance d is present between the floor 14 of the cabin 5 and said platform. As shown, the second portion of the frame 16 comprises a pair of U-shaped support portals or bridge structures, each equipped with two vertical sections or uprights which extend vertically from the platform beyond the roof 12 of the cabin, and with a horizontal crosspiece which orthogonally joins the uprights and runs parallel to the roof 12 next to the respective coupling devices. This crosspiece of each portal is equipped with respective devices for coupling to the coupling devices 13. Furthermore, there is an additional horizontal crossbeam-like portion of the frame connecting together the two U-shaped portals in their upper portion at the front face of the cabin (i.e., the one facing the direction of travel of the cabin). On the opposite side (at the front face of the cabin) there is no crosspiece joining the portals, in order to create an open structure in the forward direction to allow the relative longitudinal movement of the cabin 5 inside the frame 16. It should be appreciated that in certain embodiments, this movement is essential to enable the coupling between the cabin 5 and the trolleys 7 and 8.

Figure 6:
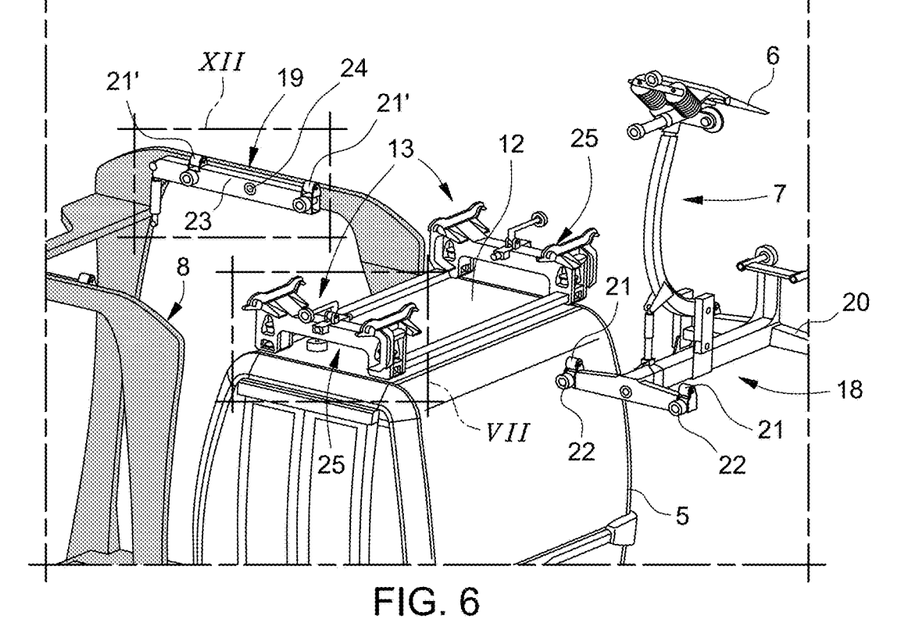
FIG. 6 shows a view of a few components of the system according to one embodiment of the disclosure.

FIG. 6 shows a view of a few components of the system according to one embodiment of the disclosure. In particular, FIG. 6 shows an embodiment of the coupling system 13 arranged on the roof 12 of the cabin 5 and configured to be coupled to the first trolley 7 along the cable section of the system 2 and to the second trolley 8 along the rail section 3. In particular, according to the general aspect of the present disclosure, the coupling system 13 is configured to be coupled to a first coupling device 18 of the first trolley 7 and to a second coupling device 19 of the second trolley 8. As will be apparent below, the coupling system 13, the first coupling device 18 and the second coupling device 19 are configured to enable a progressive passage of the cabin 5 from the first trolley 7 to the second trolley 8, or vice versa, without stopping the support, with the cabin 5 in the suspended configuration. According to this example, the first coupling device 18 connected to the first trolley 7 (which can also be a simple vice and not a real roller trolley) comprises a first double T-shaped frame 20 in which each end of the T-heads supports an idle, suspending roll 21 whose axis is parallel to the forward movement direction of the cabin 5. At each suspending roll 21 (i.e., in the same position in the frame 20 but at a slightly lower height), there is a centering roll 22 whose axis is orthogonal to that of the suspending rolls 21. How these rolls 21 and 22 collaborate with the coupling system 13 will become clear in the following. The second coupling device 19 shown in FIG. 6 and supported by the second trolley 8 comprises a pair of rocker arms 23 extending longitudinally, parallel to the forward direction of the cabin 5 (only one shown in FIG. 6) and arranged in a position such as to face the opposite side edges of the roof 12 of the cabin 5 (i.e., when coupled to the cabin). Each rocker arm can rotate around a pin 24 whose axis is orthogonal to the rocker arm 23 arranged at the centerline of said rocker arm 23. In certain embodiments, each end of the rocker arms 23 supports an idle, suspending roll 21' whose axis is parallel to the forward direction of the cabin 5. At each suspending roll 21' (i.e., in the same position as the rocker arms 23 but at a slightly lower height), there is a centering roll 22' whose axis is orthogonal to that of the suspending rolls 21. How these rolls 21' and 22' collaborate with the coupling system 13 will become clear in the following. The suspending rolls 21 and the centering rolls 22 of the first trolley 7 can have the same dimensions as the suspending rolls 21' and the centering rolls 22' of the second trolley 8. According to the example in FIG. 6, the coupling system 13 constrained to the roof of the cabin comprises two coupling structures 25 arranged along the side edges of the roof 12 of the cabin 5, wherein each end of these coupling structures 25 comprises a first coupling device configured to be coupled to the first coupling device 18 (rolls 21) of the first trolley 7, and a second coupling device configured to be coupled to the second coupling device 19 (rolls 21') of the second trolley 8.

Figure 7:
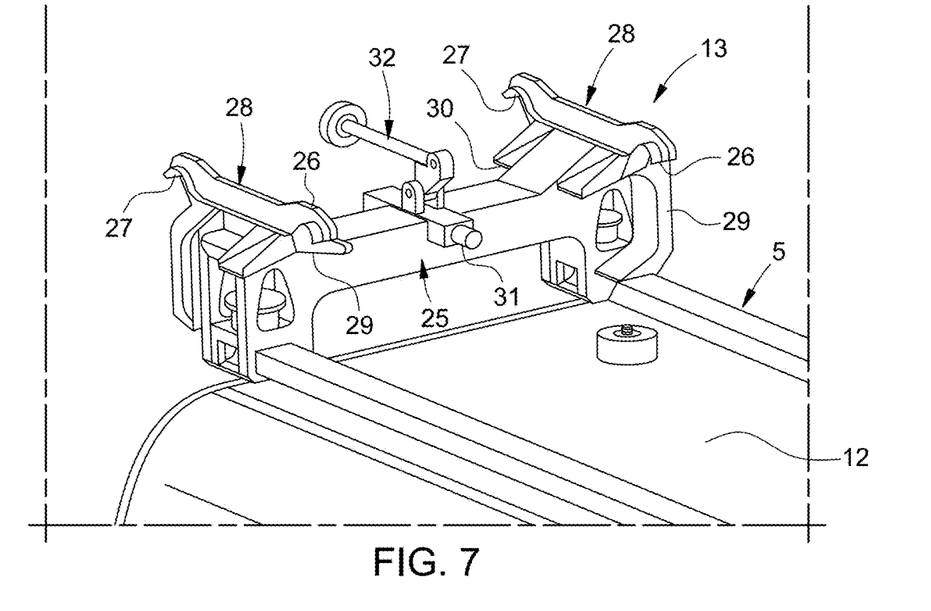
FIG. 7 is an enlarged view of the detail indicated as VII in FIG. 6.
Figure 10:
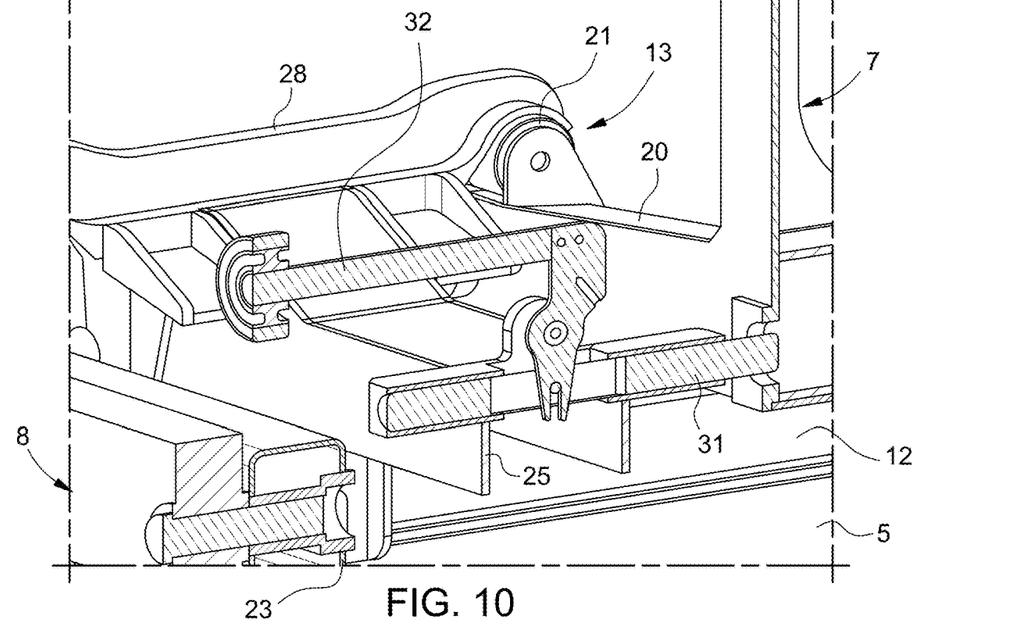
Figure 11:
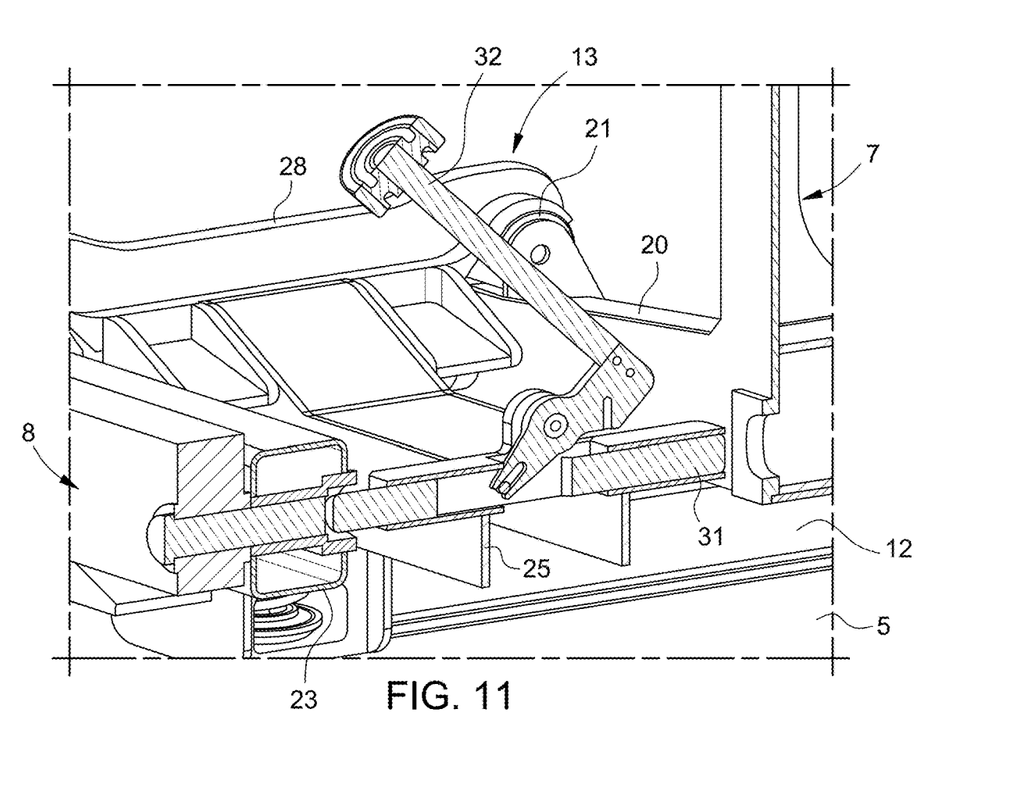

FIG. 7 is an enlarged view of the detail indicated by VII in FIG. 6, that is a view of a coupling structure 25 described above and configured to collaborate with the rolls 21 and 21' during the supporting of the cabin 5 in the cable 2 and rail 3 sections. According to this example, the first coupling device (configured to be coupled to the rolls 21) and the second coupling device (configured to be coupled to the rolls 21') are made in the form of U-shaped seats 26, 27 facing the roof 12 of the cabin 5 at the ends of two transverse bridge frames 28 located at the ends of the coupling structure 25. In particular, the U-shaped seats 26 configured to be coupled to the rolls 21 of the first trolley 7 are arranged on the inside of the roof 12 (facing the roof) of the cabin (i.e., the frame 20 of the first trolley in use is substantially located above the roof 12) whereas the U-shaped seats 27 configured to be coupled to the rolls 21' of the second trolley 8 are arranged on the outside of the roof 12 of the cabin (i.e., the frame 16 of the second trolley 8 in use is located on the outside of the cabin 5). To ensure the centering of the rolls 21 and 21' inside the respective seats 26, 27, the bridge frames 28 comprise U- or V-shaped seats 29, 30 located below the preceding seats 26, 27 configured to receive the centering rolls 22 and 22'. FIG. 7 also shows a security device in the form of a pin 31 operated by a cam lever 32. FIGS. 10 and 11 show different configurations of this pin 31 configured to lock the cabin 5 onto the trolleys 7 and 8 and offer additional safety in the event of failure of the coupling of the rolls 21, 21' into the respective seats.

Figure 8:
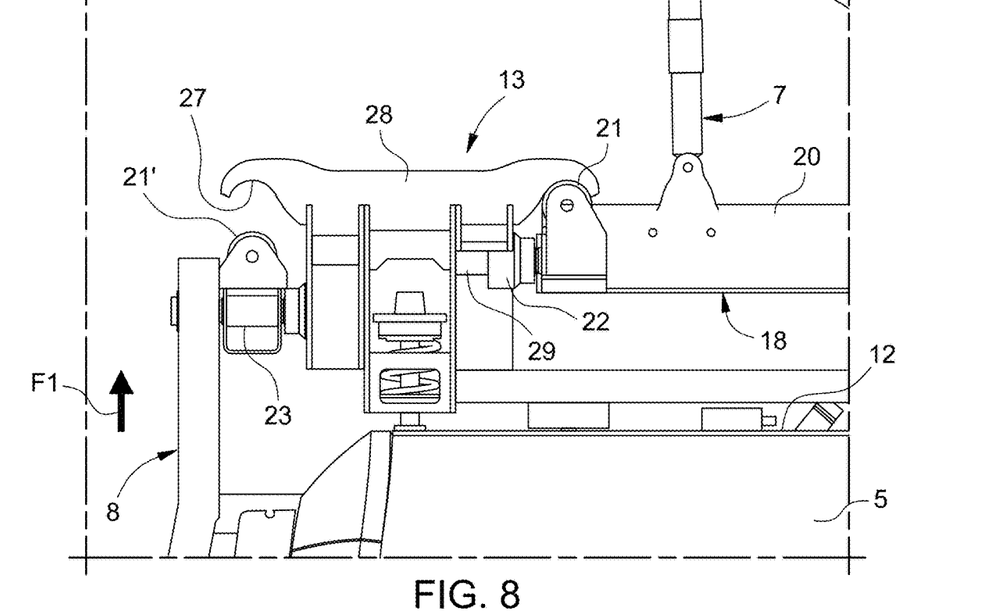
FIGS. 8 and 10 are views of the components in FIG. 6 in a first configuration of use.

FIG. 8 shows an operating phase of the system according to the embodiment of the disclosure shown in the previous figures. In particular, this FIG. 8 shows the initial phase of transfer of support of the cabin 5 from the first trolley 7 to the second trolley 8. In this configuration, the rolls 21 of the first trolley are housed in the respective seats 26 and support the cabin, whereas the rolls 21' of the second trolley only face the respective seats 27 and are (inferiorly) spaced apart therefrom. Starting from this configuration inside the exchange station, the first trolley 7 is moved forward at a constant height, whereas the second trolley 8 is moved forward at the same speed as the first trolley 7 but along an upward-sloping ramp 33 (visible in FIGS. 2-4). This ramp 33 causes the second trolley 8 to gradually rise in height (arrow F1 in FIG. 8) until it reaches the respective seats 27 and then raises the bridge 28 beyond the rolls 21 of the first trolley 7.

Figure 9:
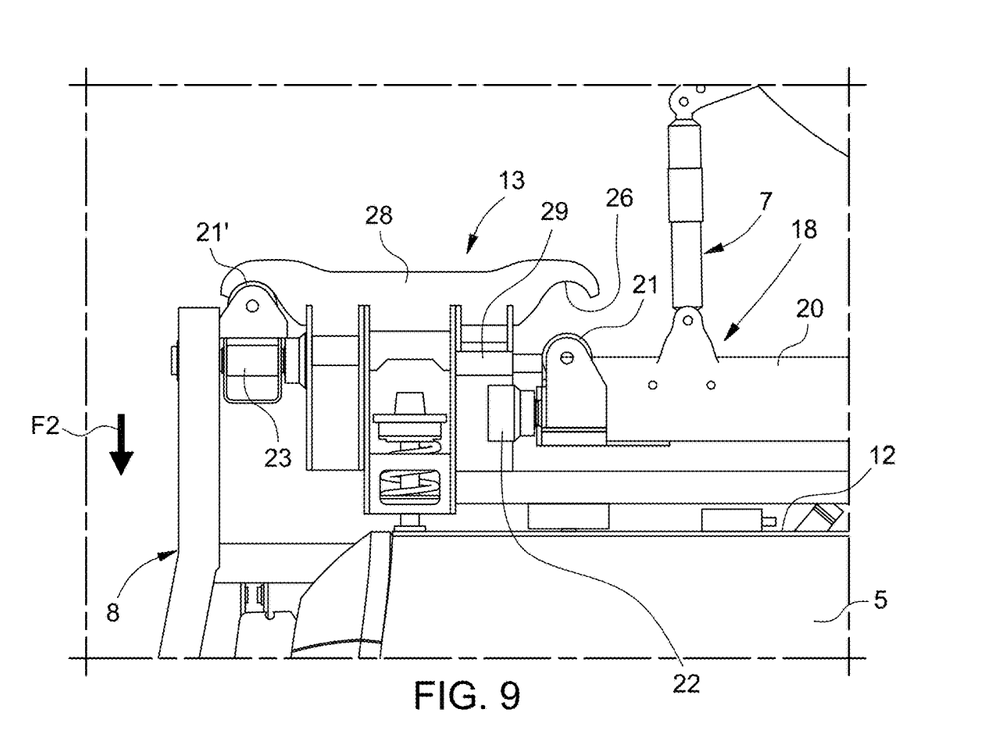
FIGS. 9 and 11 are views of the components in FIG. 6 in a second configuration of use.

FIG. 9 shows an operating phase of the system following that of the previous figure. In particular, this FIG. 9 shows the final phase of transfer of support of the cabin 5 from the first trolley 7 to the second trolley 8. That is, this figure shows that the trolley 8 has reached a height such that the rolls 21' support the cabin at a height such that the rolls 21 of the first trolley (which travels at a constant height during the exchange) are disengaged from the respective seats 26. This figure also represents the starting point of the opposite exchange in which the cabin 5 passes from the second trolley 8 to the first one 7. To carry out this exchange, the second trolley 8 simply travels a downward-sloping ramp opposite to the upward-sloping ramp 33 so as to gradually descend (arrow F2). During the descent, the seats 26 intercept the rolls 21 of the first trolley 7 and from then onwards the cabin 5 is supported by the first trolley 7. The further descent of the second trolley 8 brings the rolls 21' into a released position.

FIGS. 10 and 11 are views of the system in two different configurations of use of the pin security device 31 shown in FIG. 7. In FIG. 10, the pin 31 only protrudes from the structure 25 towards the first trolley 7 and is inserted in a respective hole obtained in the frame 20. On the contrary, in FIG. 11, the pin 31 only protrudes from the structure 25 towards the second trolley 8 and is inserted in a respective hole obtained in the rocker arm 23. The selective passage between these configurations is carried out with a cam lever 32 so that it occurs automatically when the cam passes in special guides present in the station.

Figure 12:
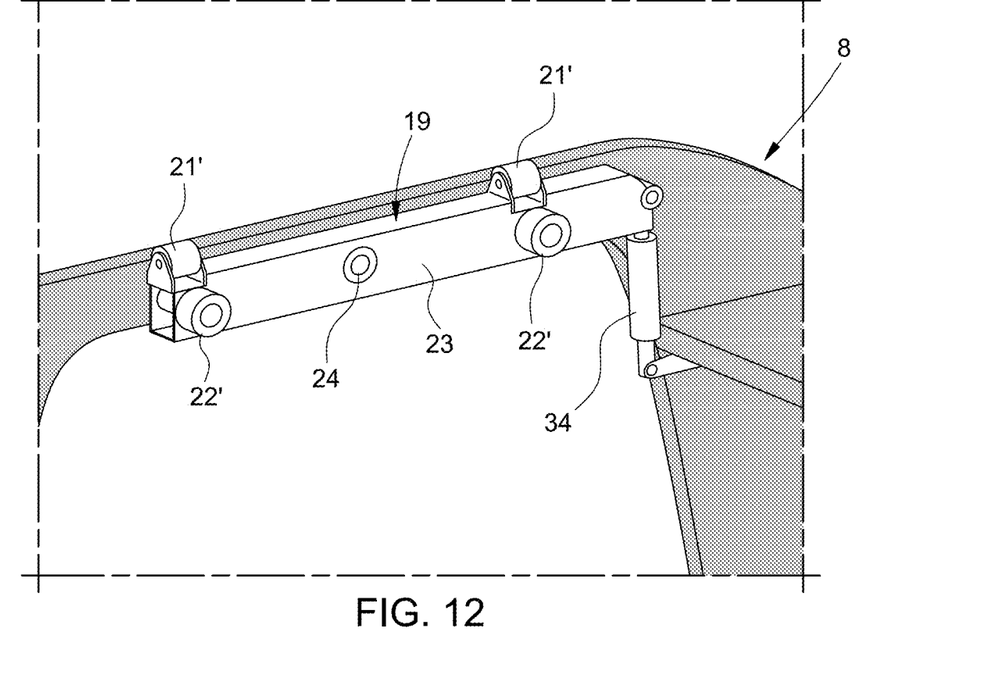
FIG. 12 is an enlarged view of the detail indicated as XII in FIG. 6.

Lastly, FIG. 12 shows an enlarged view of the detail indicated as XII in FIG. 6 (i.e., the rocker arm 23 of the second trolley 8). In particular, FIG. 12 shows that this rocker arm 23 has one end coupled to a shock absorber/damper device 34 configured to dampen the longitudinal rotation of the rocker arm 23 (and therefore of the cabin 5 when supported by the second trolley 8).

Lastly, it is clear that modifications and variations may be made to the disclosure described herein without departing from the scope of the appended claims. That is, the present disclosure also covers embodiments not described in the detailed description and equivalent embodiments, which fall within the scope of protection of the appended claims. Accordingly, various changes and modifications to the presently disclosed embodiments will be apparent to those skilled in the art.

The invention claimed is:

1. A hybrid cable/rail transportation system comprising:
   a cable transportation system portion comprising a supporting cable;
   a rail transportation system portion comprising a rail, wherein the rail transportation system portion is at least one of: upstream of the cable transportation system portion and downstream of the cable transportation system portion;
   a station wherein a passage from the cable transportation system portion to the rail transportation system portion can occur;
   a transportation unit comprising a cabin, wherein a coupling system is arranged on a roof of the cabin;
   a first trolley coupled to the supporting cable and comprising a first coupling device configured to be coupled to the coupling system arranged on the roof of the cabin along the cable transportation system portion; and
   a second trolley coupled to the rail and comprising a second coupling device configured to be coupled to the coupling system arranged on the roof of the cabin along the rail transportation system portion, wherein the second coupling device of the second trolley is configured to enable the passage of the cabin from the first trolley to the second trolley without stopping support of the cabin.

2. The hybrid cable/rail transportation system of claim 1, wherein the coupling system arranged on the roof of the cabin comprises:
   a first coupling device configured to be coupled to the first coupling device of the first trolley, and
   a second coupling device configured to be coupled to the second coupling device of the second trolley.

3. The hybrid cable/rail transportation system of claim 2, wherein the first coupling device of the coupling system and the second coupling device of the coupling system comprise two opposite portions of at least one coupling structure.

4. The hybrid cable/rail transportation system of claim 3, wherein two coupling structures are arranged at opposite edges on the roof of the cabin such that the two first coupling devices face each other and the two second coupling devices face outside of the cabin.

5. The hybrid cable/rail transportation system of claim 2, wherein the coupling devices comprise U seats facing the ground, the coupling devices comprise suspending rolls configured to be coupled to the U seats of the coupling devices.

6. The hybrid cable/rail transportation system of claim 5, further comprising a plurality of centering systems configured to center the suspending rolls inside the corresponding U seats of the coupling devices.

7. The hybrid cable/rail transportation system of claim 1, wherein the coupling system arranged on the roof of the cabin comprises a security device configured to selectively block the coupling to the first trolley and the second trolley.

8. The hybrid cable/rail transportation system of claim 7, wherein the security device comprises a pin movable between a first position in which the pin is coupled to the first trolley and a second position in which the pin is coupled to the second trolley.

9. The hybrid cable/rail transportation system of claim 1, wherein the second coupling device is supported by a rocker arm configured to enable longitudinal oscillations of the cabin when coupled to the second trolley.

10. The hybrid cable/rail transportation system of claim 9, further comprising a damper device configured to dampen the longitudinal oscillations of the rocker arm.

11. A hybrid cable/rail transportation system comprising:
    a cable transportation system portion comprising a supporting cable;
    a rail transportation system portion comprising a rail, wherein the rail transportation system portion is at least one of: upstream of the cable transportation system portion and downstream of the cable transportation system portion;
    a station wherein a passage from the rail transportation system portion to the cable transportation system portion can occur;
    a transportation unit comprising a cabin, wherein a coupling system is arranged on a roof of the cabin;
    a first trolley coupled to the supporting cable and comprising a first coupling device configured to be coupled to the coupling system arranged on the roof of the cabin along the cable transportation system portion; and
    a second trolley coupled to the rail and comprising a second coupling device configured to be coupled to the coupling system arranged on the roof of the cabin along the rail transportation system portion, wherein the second coupling device of the second trolley is configured to enable the passage of the cabin from the second trolley to the first trolley without stopping support of the cabin.

12. The hybrid cable/rail transportation system of claim 11, wherein the coupling system arranged on the roof of the cabin comprises:
    a first coupling device configured to be coupled to the first coupling device of the first trolley, and
    a second coupling device configured to be coupled to the second coupling device of the second trolley.

13. The hybrid cable/rail transportation system of claim 12, wherein the first coupling device of the coupling system and the second coupling device of the coupling system comprise two opposite portions of at least one coupling structure.

14. The hybrid cable/rail transportation system of claim 13, wherein two coupling structures are arranged at opposite edges on the roof of the cabin such that the two first coupling devices face each other and the two second coupling devices face outside of the cabin.

15. The hybrid cable/rail transportation system of claim 12, wherein the coupling devices comprise U seats facing the ground, the coupling devices comprise suspending rolls configured to be coupled to the U seats of the coupling devices.

16. The hybrid cable/rail transportation system of claim 15, further comprising a plurality of centering systems configured to center the suspending rolls inside the corresponding U seats of the coupling devices.

17. The hybrid cable/rail transportation system of claim 11, wherein the coupling system arranged on the roof of the cabin comprises a security device configured to selectively block the coupling to the first trolley and the second trolley.

18. The hybrid cable/rail transportation system of claim 17, wherein the security device comprises a pin movable between a first position in which the pin is coupled to the first trolley and a second position in which the pin is coupled to the second trolley.

19. The hybrid cable/rail transportation system of claim 11, wherein the second coupling device is supported by a rocker arm configured to enable longitudinal oscillations of the cabin when coupled to the second trolley.

20. The hybrid cable/rail transportation system of claim 19, further comprising a damper device configured to dampen the longitudinal oscillations of the rocker arm.

* * * * *